US009846229B1

(12) United States Patent
Doerry et al.

(10) Patent No.: US 9,846,229 B1
(45) Date of Patent: Dec. 19, 2017

(54) RADAR VELOCITY DETERMINATION USING DIRECTION OF ARRIVAL MEASUREMENTS

(71) Applicant: National Technology & Engineering Solutions of Sandia, LLC, Albuquerque, NM (US)

(72) Inventors: Armin W. Doerry, Albuquerque, NM (US); Douglas L. Bickel, Albuquerque, NM (US); Richard M. Naething, Albuquerque, NM (US); Volker Horndt, San Diego, CA (US)

(73) Assignee: National Technologies & Engineering Solutions of Sandia, LLC, Albuquerque, NM (US)

( * ) Notice: Subject to any disclaimer, the term of this patent is extended or adjusted under 35 U.S.C. 154(b) by 436 days.

(21) Appl. No.: 14/645,131

(22) Filed: Mar. 11, 2015

(51) Int. Cl.
  *G01S 13/60* (2006.01)
  *G01S 13/90* (2006.01)
(52) U.S. Cl.
  CPC ........ *G01S 13/9035* (2013.01); *G01S 13/605* (2013.01); *G01S 2013/9041* (2013.01)
(58) Field of Classification Search
  CPC .................................................. G01S 13/605
  USPC ........................................................ 342/25 F
  See application file for complete search history.

(56) References Cited

U.S. PATENT DOCUMENTS

| 6,853,330 B1 * | 2/2005 | Krikorian | ............. | G01S 7/4026 342/149 |
| 8,212,714 B1 * | 7/2012 | Doerry | ...................... | G01S 7/40 342/165 |

OTHER PUBLICATIONS

Paschall, et al., "Design and Analysis of an Integrated Targeting System", Aerospace and Electronics Conference—Proceedings of IEEE NAECON 1994, vol. 2, pp. 937-944, 1994.
Pachter, et al., "Bearings-Only Measurements for INS Aiding: The Three Dimensional Case", Proceedings of the 2004 American Control Conference, vol. 6, pp. 5363-5368, 2004.
Layne, et al., "Integrated Synthetic Aperture Radar and Navigation Systems for Targeting Applications", Avionics Directorate—Wright-Patterson Air Force Base, pp. 1-53, 1997.

(Continued)

*Primary Examiner* — Tashiana Adams
*Assistant Examiner* — Helena Seraydaryan
(74) *Attorney, Agent, or Firm* — Medley, Behrens & Lewis, LLC

(57) ABSTRACT

The various technologies presented herein relate to utilizing direction of arrival (DOA) data to determine various flight parameters for an aircraft A plurality of radar images (e.g., SAR images) can be analyzed to identify a plurality of pixels in the radar images relating to one or more ground targets. In an embodiment, the plurality of pixels can be selected based upon the pixels exceeding a SNR threshold. The DOA data in conjunction with a measurable Doppler frequency for each pixel can be obtained. Multi-aperture technology enables derivation of an independent measure of DOA to each pixel based on interferometric analysis. This independent measure of DOA enables decoupling of the aircraft velocity from the DOA in a range-Doppler map, thereby enabling determination of a radar velocity. The determined aircraft velocity can be utilized to update an onboard INS, and to keep it aligned, without the need for additional velocity-measuring instrumentation.

19 Claims, 4 Drawing Sheets

(56) References Cited

OTHER PUBLICATIONS

Kim, et al., "An Integrated Navigation System Using GPS Carrier Phase for Real-Time Airborne/Synthetic Aperture Radar (SAR)", Navigation—Journal of the Institute of Navigation, vol. 4, No. 1, pp. 13-24, 2001.
Madsen, S. Norvang, "Estimating the Doppler Centroid of SAR Data", IEEE Transactions on Aerospace and Electronic Systems, vol. AES-25, No. 2, Geoscience and Remote Sensing Symposium, 1996, IGARSS—Remote Sensing for a Sustainable Future, vol. 3, pp. 134-140, 1989.

* cited by examiner

RADAR VELOCITY DETERMINATION USING DIRECTION OF ARRIVAL MEASUREMENTS

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

High-performance synthetic aperture radar (SAR) requires precise knowledge of the relative motion between a radar system (e.g., an airborne radar system) and a target scene. This is most often accomplished with a global positioning system (GPS)-aided navigation system, e.g., an inertial navigation system (INS). Integral to an INS is an inertial measurement unit (IMU), whereby the IMU is typically composed of three orthogonal accelerometers and three orthogonal rate gyroscopes. The task of the GPS is to provide absolute references for correcting errors which can occur at the IMU owing to noise, drift, etc.

Correction of IMU and subsequent INS motion information is often performed via a linear quadratic estimation (LQE) such as a Kalman Filter (KF), an Extended Kalman Filter (EKF), etc., which combines the GPS and IMU data to estimate errors and corrections, and to achieve a blended motion measurement solution. Such an algorithm and its implementation are frequently referred to collectively as the "navigator". The correction of IMU and subsequent INS motion information is termed "alignment" of the navigator.

In the absence of GPS-aiding, instrument noise in the INS can cause drifts in the motion data, which can lead to inaccurate estimates of position, velocity, angular orientation, etc.

In particular, an error in the velocity estimate can yield an azimuth scaling error in a SAR image, as well as a mis-focus or blurring in the image. At non-broadside squint angles, a velocity error can be manifested as an unknown and undesired Doppler shift, further manifesting as an additional position shift and illumination error, with attendant deleterious effects on radar cross section (RCS) estimation.

SUMMARY

The following is a brief summary of subject matter that is described in greater detail herein. This summary is not intended to be limiting as to the scope of the claims.

Various exemplary embodiments presented herein relate to utilizing data collected during radar imaging to determine a velocity of a moving body, such as an aircraft, and accordingly, the velocity of an onboard radar system. Thus, an on board navigational system (e.g., an INS) can be updated (i.e. corrected) with the aircraft velocity, direction, etc., even though GPS signaling may be unavailable.

In a radar image (e.g., a SAR image), radar velocity and direction of arrival (DOA) can combine to yield a measurable Doppler frequency for any particular pixel in the radar image. Multi-aperture techniques such as monopulse radar enable derivation of an independent measure of DOA to each pixel in the radar image based on interferometric analysis. This independent measure of DOA enables precise and accurate decoupling of the radar velocity from the DOA in the radar image pixels, thereby enabling determination of a radar velocity, aircraft velocity, etc. Information obtained by the radar system can assist in aligning the navigator and its INS, and maintain alignment, even for large velocity errors, without the need for additional velocity-measuring instrumentation (e.g., GPS-based).

In an embodiment, a plurality of pixels can be identified in one or more radar images, whereby the plurality of pixels can identify a ground target detected by the radar system. For each pixel, in the plurality of pixels, respective Doppler frequency and squint angle values can be determined. In an embodiment, respective coordinates can be determined for respective pixel pairs based upon a difference between the respective Doppler frequency and squint angle values. In a further embodiment, a plot of the coordinates for the differences in Doppler frequencies and squint angles for the plurality of pixels can be generated. A best fit line can be determined for the plot (and/or the coordinates), from which a reference radar velocity, a reference aircraft velocity, and a reference squint angle can be determined. The navigational system and/or the radar image can be corrected with the reference radar velocity and reference squint angle.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
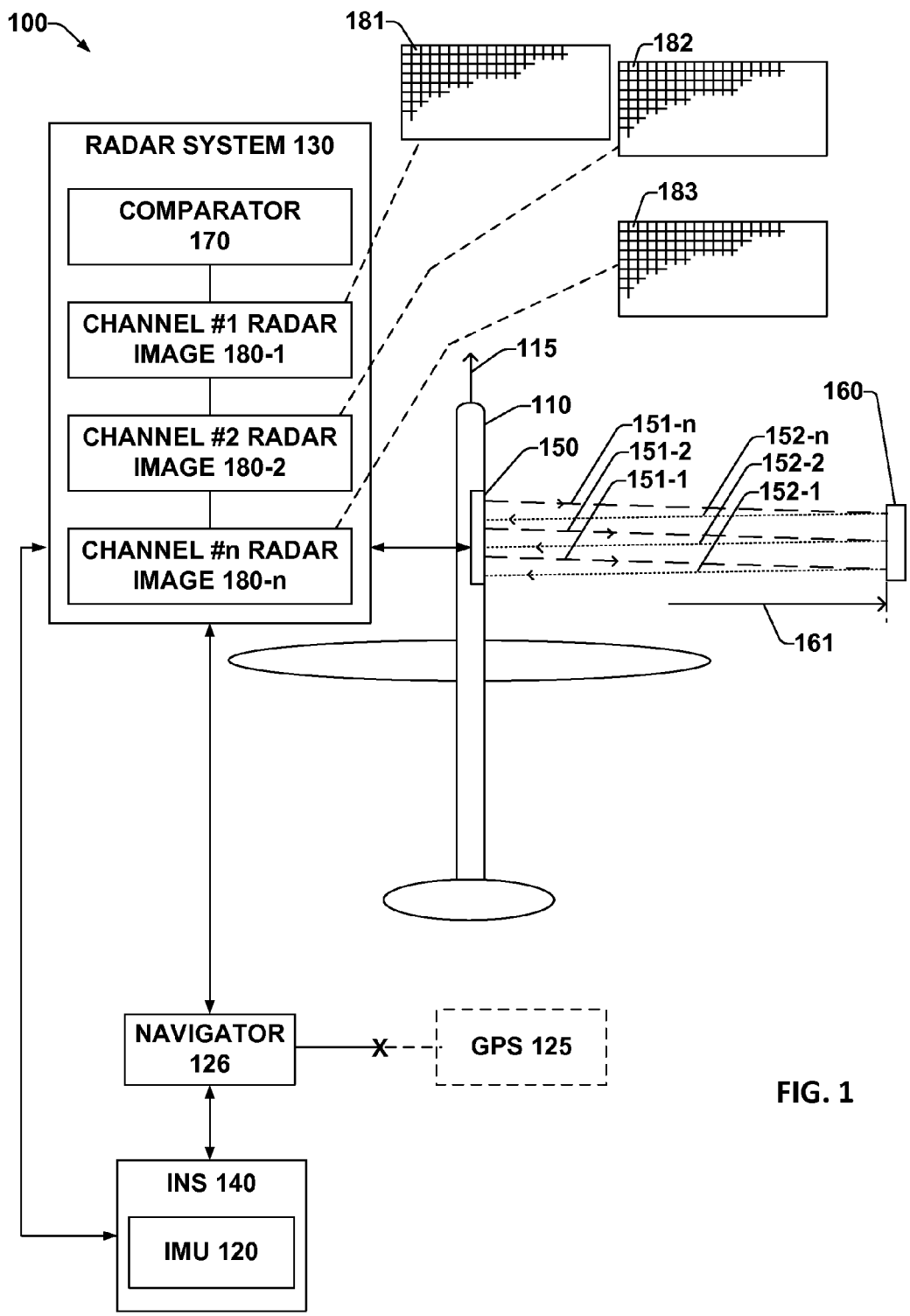
FIG. 1 illustrates a system comprising an aircraft and associated radar system where GPS is not available.

Various technologies pertaining to measurement and/or determination of radar velocity, aircraft velocity, squint angle, etc., by utilizing direction of arrival measurement(s) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Moreover, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As noted above, exemplary embodiments presented herein relate to measurement and/or determination of various operational parameters of an aircraft by utilizing direction of arrival measurement(s) (DOA). It is noted that a radar image (e.g., a SAR image) is essentially a range-Doppler map of a target scene, where azimuth position in the radar image depends on a pixel content's actual line-of-sight velocity, which in turn depends on its instantaneous squint angle and the radar velocity. An independent measure of the squint angle to a target pixel enables calculation of a radar's velocity, thereby facilitating improved radar image formation. Such an independent measure is achievable using interferometric DOA techniques using a multi-aperture antenna, as further described herein. Information obtained by the radar system can assist in aligning, and maintaining the alignment of the navigator without the need for additional velocity-measuring instrumentation. In an aspect, a Kalman filter (e.g., an EKF) is not necessarily utilized in the updating of the INS with information obtained from the DOA analysis. A navigator (which is often based on the EKF) can be updated with information obtained with information obtained from the DOA analysis.

It is to be noted that the radar velocity is determined with respect to the ground, and not airspeed. Further, it is to be appreciated that while the various embodiments are directed towards a monopulse SAR system, the various embodiments are applicable to any suitable system.

FIG. 1 illustrates a system 100 comprising an aircraft and associated radar system which has lost position signaling from a GPS, and accordingly, is unable to align a navigator based upon GPS signaling. In system 100, an IMU 120 is located on aircraft 110 and is measuring the orientation of at least one of the aircraft 110, or a radar system 130 located on the aircraft, with reference to a direction of travel 115. In an aspect, assuming that the aircraft 110 is undergoing minimal or no yaw then the direction of travel 115 of the aircraft 110 can be considered to be the aircraft front. The IMU 120 can be providing motion measurement data to an INS 140, which in turn can be providing navigational data to the navigator 126. In an aspect, the IMU 120 can be located within the INS 140.

As previously mentioned, in a conventional system, a navigator can combine information provided by the INS with GPS data to yield a filtered motion solution, where the filter can be an EKF. The output of the navigator can be utilized by a radar system (e.g., to correct a radar image). As indicated by the broken line, contrary to a conventional radar/navigation system, communication with a GPS 125 signaling system is unavailable, and accordingly, a navigator 126 which can include an estimator (e.g., an LQE, a KF, an EKF, etc.) is unable to remain aligned (e.g., due to errors at the INS 140, which can be due to noise at the IMU 120). Hence, additional navigational data is to be derived from data obtained at the radar system 130 (e.g., radar monopulse data such as DOA information) to offset the lost GPS navigational data.

The on board radar system 130 is operating in conjunction with an antenna 150, the IMU 120, the INS 140, and the navigator 126. In an embodiment, the antenna 150 can be an antenna array utilizing monopulse radar technology. The antenna array 150 can be directed towards a ground-based target 160. The target 160 can be stationary, or slow moving, and is illuminated by a plurality of radar pulses 151-1-151-$n$, where n is a positive integer. In an aspect, target 160 can be aligned broadside, or relatively broadside, to the antenna array 150, as indicated by line 161. As utilized in SAR techniques, the plurality of radar pulses 151-1-151-$n$ are successively transmitted from the antenna 150 to the target 160, with the respective echo pulses 152-1-152-$n$ being reflected back to, and received at, respective channels (e.g., respective antenna elements) of the antenna array 150. In an aspect, each antenna in the antenna array can simultaneously receive data (e.g., any of echo pulses 152-1-152-$n$) from the same transmitted pulse (e.g., any of radar pulses 151-1-151-$n$). The echo pulses 152-1-152-$n$ can be utilized to generate a plurality of radar images 180-1-180-$n$, whereby the respective radar images 180-1-180-$n$ can include an image of the target 160. Each image can be associated with an antenna channel of antenna 150, such that radar image 180-1 is generated via a first channel, channel #1; radar image 180-2 is generated via a second channel, channel #2; and radar image 180-$n$ is generated via an $n^{th}$ channel, channel #n. Further, each respective radar image can be formed from a plurality of pixels. As shown in FIG. 1, a first pixel 181 can be included in a radar image 180-1, a second pixel can be included in a radar image 180-2, and a third pixel 183 (e.g., an $n^{th}$ pixel) can be included in radar image 180-$n$, whereby pixels 181, 182, and 183 can correspond to a detected feature, e.g., the target 160. An individual pixel's coordinates in each image can uniquely identify a specific range and Doppler. Hence, each radar image formed for each antenna channel (e.g., any of radar images 180-1-180-$n$) represents a mapping of echo energy over range and Doppler, i.e. a range-Doppler map.

The radar system 130 can further include a comparator component 170, whereby comparator component 170 can be utilized to analyze and/or compare the radar images (e.g., radar images 180-1-180-$n$) created from the independent monopulse antenna channels. The collection of radar images, one from each channel, can be compared to estimate DOA for one or more pixels (e.g., pixels 181 and 182, pixels 181 and 183, etc.) which are common to each of the radar images. That is, the same pixel location across the images from the different channels can be compared to estimate DOA as a function of Doppler frequency. This information can be used to calculate velocity parameters that may then be fed back into the navigator 126, or otherwise be used to correct image processing at the radar system 130.

It is to be appreciated that while FIG. 1 illustrates radar pulses 151-1-151-$n$ and echo pulses 152-1-152-$n$ as being parallel and seemingly concurrent, the radar pulses 151-1-151-$n$ are transmitted from the antenna array 150 in a sequential manner as the aircraft 110 continues on its flight path 115. Hence, in sequence of generation, radar pulse 151-1 is initially transmitted towards target 160, followed by transmission of radar pulse 151-2, and subsequently, transmission of radar pulse 151-$n$. Furthermore, as the aircraft 110 continues on its journey, to facilitate comparison between data obtained from echo pulses 152-1-152-$n$, the line-of-sight for a specific antenna in the multi-antenna array 150 may have to be adjusted (e.g., the antenna boresight is adjusted) to maintain directing the antenna onto the target 160, as further described below.

In an aspect, a line-of-sight velocity $v_{los}$ of the radar antenna 150 towards the target 160 is calculated (e.g., by the comparator component 170) as:

$$v_{los} = v_a \cos \theta_s \qquad \text{Eqn. 1}$$

where $v_a$ is a forward velocity of the aircraft 110, and $\theta_s$ is a squint angle between a velocity vector describing the forward velocity of the aircraft 110 and a line-of-sight from the antenna array 150 to the target 160 (e.g., direction 161).

It is presumed that the aircraft 110 carrying the radar system 130 is flying in straight and level flight. Accordingly, a Doppler frequency, $f_d$, that target 160 imparts to a radar echo (e.g., any of echoes 152-1-152-n) can be determined:

$$f_d = \frac{2}{\lambda} v_{los} \qquad \text{Eqn. 2}$$

where $\lambda$ is the nominal wavelength of the radar system 130. It is to be noted that with this convention, $v_{los}$ is a closing velocity, and a $v_{los}$ having a positive value yields a positive Doppler frequency, $f_d$.

Combining Eqn. 1 with Eqn. 2 yields:

$$f_d = \frac{2}{\lambda} v_a \cos \theta_s \qquad \text{Eqn. 3}$$

A target 160 would be represented by at least one particular pixel in each radar image 180-1-180-n (e.g., by a first pixel, by a second pixel, etc.). For such a particular pixel (e.g., any of pixels 181, 182, or 183), its Doppler frequency $f_d$ could be fairly precisely known. In addition, an independent measure of a squint angle $\theta_s$ for that pixel can be made with the multiple-aperture antenna 150 using any suitable DOA technique. With the additional knowledge of a wavelength $\lambda$ of operation of the radar system 130 (e.g., a particular wavelength of any of radar pulses 151-1-151-n or echo pulses 152-1-152-n), it is possible to solve for aircraft velocity $v_a$. However, absolute knowledge of $\theta_s$ with sufficient precision and accuracy may be problematic. Even $f_d$ may sometimes be ambiguous due to insufficient knowledge of an orientation of the antenna 150 with respect to a velocity vector of the aircraft 110 (e.g., direction 115). Accordingly, a differential approach is suitable, as further presented herein.

Firstly, the squint angle is expanded into a reference squint angle and an offset, namely:

$$\theta_s = \theta_{s,0} + \phi \qquad \text{Eqn. 4}$$

where $\theta_{s,0}$ is a reference squint angle, and $\phi$ is an offset angle for a target pixel in a respective radar image (e.g., any of radar images 180-1-180-n). Accordingly, expanding Eqn. 3 based upon Eqn. 4 forms:

$$f_d = \frac{2}{\lambda} v_a \cos(\theta_{s,0} + \phi) \qquad \text{Eqn. 5}$$

Observations regarding the nature of the reference squint angle and the offset angle include:

(a) A typical antenna (e.g., antenna 150) for a SAR system will often exhibit a fairly small azimuth beamwidth, perhaps on the order of low-single-digit degrees.

(b) In a single radar image (e.g., any of radar images 180-1-180-n), it is anticipated that the absolute squint angles to the various pixels (e.g., any of pixels 181, 182, or 183) will be fairly close together, e.g., to within one antenna azimuth beamwidth of each other.

(c) $\theta_{c,0}$ is the squint angle to an antenna boresight of antenna 150.

(d) Normal operation involves the antenna (e.g., antenna 150) being pointed to broadside (e.g., direction 161) with respect to the velocity vector (e.g., as measured in direction 115), or as near to broadside as possible; broadside being when $\theta_{s,0} = 90$ degrees.

(e) Offset angles $\theta$ will typically have a magnitude less than one-half the antenna azimuth beamwidth (e.g., of antenna 150).

The observations enable linearization of the cosine with a first-order Taylor series expansion:

$$\cos(\theta_{s,0} + \phi) \approx \cos(\theta_{s,0}) - \sin(\theta_{s,0}) \phi \qquad \text{Eqn. 6}$$

whereby the expression for Doppler frequency (Eqn. 5) can be rewritten as:

$$f_d = -\frac{2}{\lambda} v_a \sin(\theta_{s,0}) \phi + \frac{2}{\lambda} v_a \cos(\theta_{s,0}) \qquad \text{Eqn. 7}$$

Eqn. 7 is an equation of a line, where $$f_d = m\phi \pm b \qquad \text{Eqn. 8}$$

and, where, accordingly:

$$m = \frac{df_d}{d\phi} = -\frac{2}{\lambda} v_a \sin \theta_{s,0} \text{ which in the slope of a line, and} \qquad \text{Eqn. 9}$$

which is the slope of a line, and Eqn. 9

$$b = f_d |_{\phi=0} = \frac{2}{\lambda} v_a \cos \theta_{s,0} = y\text{-intercept}(f_d\text{-intercept}). \qquad \text{Eqn. 10}$$

In a range-Doppler map (e.g., any of radar images 180-1-180-n)), coupled to multi-aperture DOA techniques, each pixel in the range-Doppler map yields a data pair ($\phi_i$, $f_{d,i}$) where the subscript i denotes a particular data pair obtained for a particular pixel. The parameters m and b which best fit this data are to be determined. It can be advantageous to limit a data set to pixels that exhibit a minimum signal-to-noise ratio (SNR) threshold. For example, a brightness threshold can be established (e.g., for any of radar images 180-1-180-n), and only those pixels which have a particular brightness (e.g., with a background as a reference) are selected for comparison, as further described. In another example, a signal threshold, e.g., a decibel (dB) threshold, can be utilized.

Given a set of pixels and corresponding measures, any of a number of suitable techniques can be utilized to fit a line to the data ($\phi_i$, $f_{d,i}$). A suitable technique involves calculating the Minimum Mean Squared Error (MMSE) solution. Firstly, the following vectors are defined:

$$\underline{\phi} = [\phi_1, \phi_2, \ldots, \phi_I]^T$$

$$\underline{f_d} = [f_{d,1}, f_{d,2}, \ldots, f_{d,I}]^T, \text{ and}$$

$$\underline{1} = [1, 1, \ldots, 1]^T$$

All vectors are of length I, where I is the number of pixels used, and wherein the superscript T denotes transpose. The matrix and vector can be defined as:

$$A = [\underline{\phi}, \underline{1}], \text{ and} \qquad \text{Eqn. 11}$$

$$b = \underline{f_d} \qquad \text{Eqn. 12}$$

from which a matrix equation can be derived as:

$$A\begin{bmatrix} m \\ b \end{bmatrix} = b \qquad \text{Eqn. 13}$$

solving for the slope and intercept:

$$\begin{bmatrix} m \\ b \end{bmatrix} = (A^T A)^{-1} A^T b \qquad \text{Eqn. 14}$$

Based on the foregoing, the parameters for a MMSE best-fit line to the relationship of $f_d$ data to $\phi$ data have been obtained. Furthermore, calculation of the best-fit actual reference squint angle can be determined, based upon:

$$\cot\theta_{s,0} = -\frac{b}{m} = x\text{-intercept.} \qquad \text{Eqn. 15}$$

In an embodiment, coordinates can be determined for each pixel and the respective information ($\phi_i$, $f_{d,i}$), from which the MMSE best-fit line can be determined.

Figure 2:
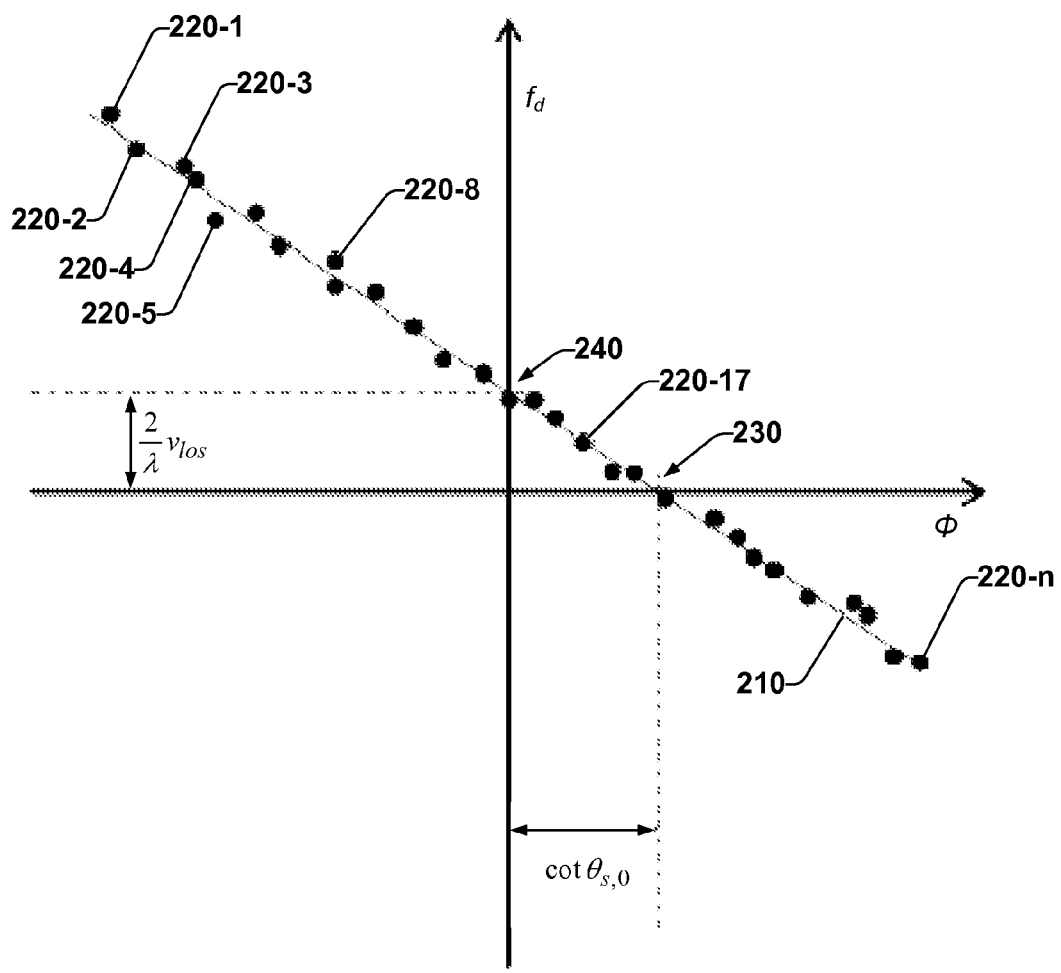
FIG. 2 is a plot of Doppler frequency versus offset angle for a plurality of radar image pixels, according to an embodiment.

FIG. 2 presents a graphical representation (e.g., a plot) of the various quantities and their relation(s), whereby the x axis is the offset angle, $\phi$, and the y-axis is the Doppler frequency, $f_d$. Plot 210 is a MMSE best fit line for a plurality of points 220-1-220-n, where each point 220-1-200-n is based upon values derived from respective pixels in a radar image (e.g., pixels 181, 182, and/or 183). As the x axis of plot 210 is the $\phi$ axis, accordingly, the x-intercept 230 is the $\phi$ intercept, (as indicated cot $\phi_{s,0}$) is marked 230 on FIG. 2, which can be considered to be the off-broadside angle towards a flight path broadside. As previously mentioned, when $\phi_{s,0}=90$ degrees, cot $\theta_{s,0}$ is a small number. Further, as the y axis is $f_d$, the intercept 240 (as indicated $2/\lambda v_{los,0}$) can be considered to be the Doppler frequency shift in a direction of the antenna boresight.

It is to be appreciated that while FIG. 2 shows a plurality of points 220-1-220-n (or coordinates) being plotted to enable the best fit line 210 to be obtained, only a minimum of two points are required to perform an initial best fit line operation between the two points. Each point 220-1-220-n represents the respective differences in offset angle, $\phi$, and Doppler frequency, $f_d$ for a first pixel in a first radar image and a second pixel in a second radar image. For example, point 220-1 is derived based upon a respective difference between the offset angle and the Doppler frequency of a first pixel (e.g., pixel 181) in a first radar image and the offset angle and the Doppler frequency of a second pixel (e.g., pixel 182) in a second radar image, wherein the first pixel and the second pixel both correlate to a target illuminated by the radar system (e.g., target 160). Further, point 220-2 is derived based upon a respective difference between the offset angle and the Doppler frequency of a third pixel in the first radar image and the offset angle and the Doppler frequency of a fourth pixel in the second radar image, wherein the third pixel and the fourth pixel can correlate to the target indicated by the first pixel and the second pixel, or the third pixel and the fourth pixel can correlate to another target illuminated by the radar system. As previously mentioned, the first pixel, the second pixel, the third pixel and the fourth pixel can each have a SNR above a threshold value.

The sine, sin $\theta_{s,0}$ of the squint angle can be calculated (e.g., by the comparator component 170):

$$\sin\theta_{s,0} = \frac{-m}{\sqrt{m^2 + b^2}} \qquad \text{Eqn. 16}$$

Accordingly, the aircraft velocity, $v_a$, can be calculated:

$$v_a = \left(\frac{\lambda}{2}\right)\sqrt{m^2 + b^2} \qquad \text{Eqn. 17}$$

The line-of-sight velocity, $v_{los,0}$ in the direction of the antenna beam boresight is:

$$v_{los,0} = \left(\frac{\lambda}{2}\right)b \qquad \text{Eqn. 18}$$

Based on the foregoing, the radar system 130 can determine the aircraft velocity, $v_a$, and the squint angle, $\theta_{s,0}$. Accordingly, the determined aircraft velocity and the squint angle can be utilized for any of the following:

(a) Determining the forward ground-speed of the aircraft 110.

(b) Determining a crab-angle of the aircraft 110, via the difference between $\theta_{s,0}$ and an actual antenna gimbal to the body angle of aircraft 110.

(c) Determining the line-of-sight velocity of the radar system 130 in the direction of the antenna boresight.

(d) Providing correct azimuthal scaling of the radar image 180.

(e) Allowing correct application of antenna beam-pattern corrections to radiometrically calibrate the radar image 180.

(f) Update an initial velocity (e.g., a velocity estimate) of the aircraft being utilized by the aircraft INS 140 with the determined aircraft velocity, where the determined aircraft velocity can be considered an actual velocity of the aircraft, e.g., as received from the comparator component 170.

For many operational situations, a single-axis azimuth monopulse measure (or equivalent) can suffice. This is particularly true when either the azimuth monopulse axis is aligned with the platform velocity vector, or when the target scene is flat (which is reasonably typical for many SAR images). However, for a target scene with significant topographical relief, and a large line-of-sight velocity, an additional elevation DOA measure can be utilized to refine the relationship of DOA to pixel Doppler measure. This additional elevation DOA measure might come from an additional elevation monopulse antenna characteristic, or perhaps from a Digital Terrain Elevation Data (DTED) database.

Figure 3:
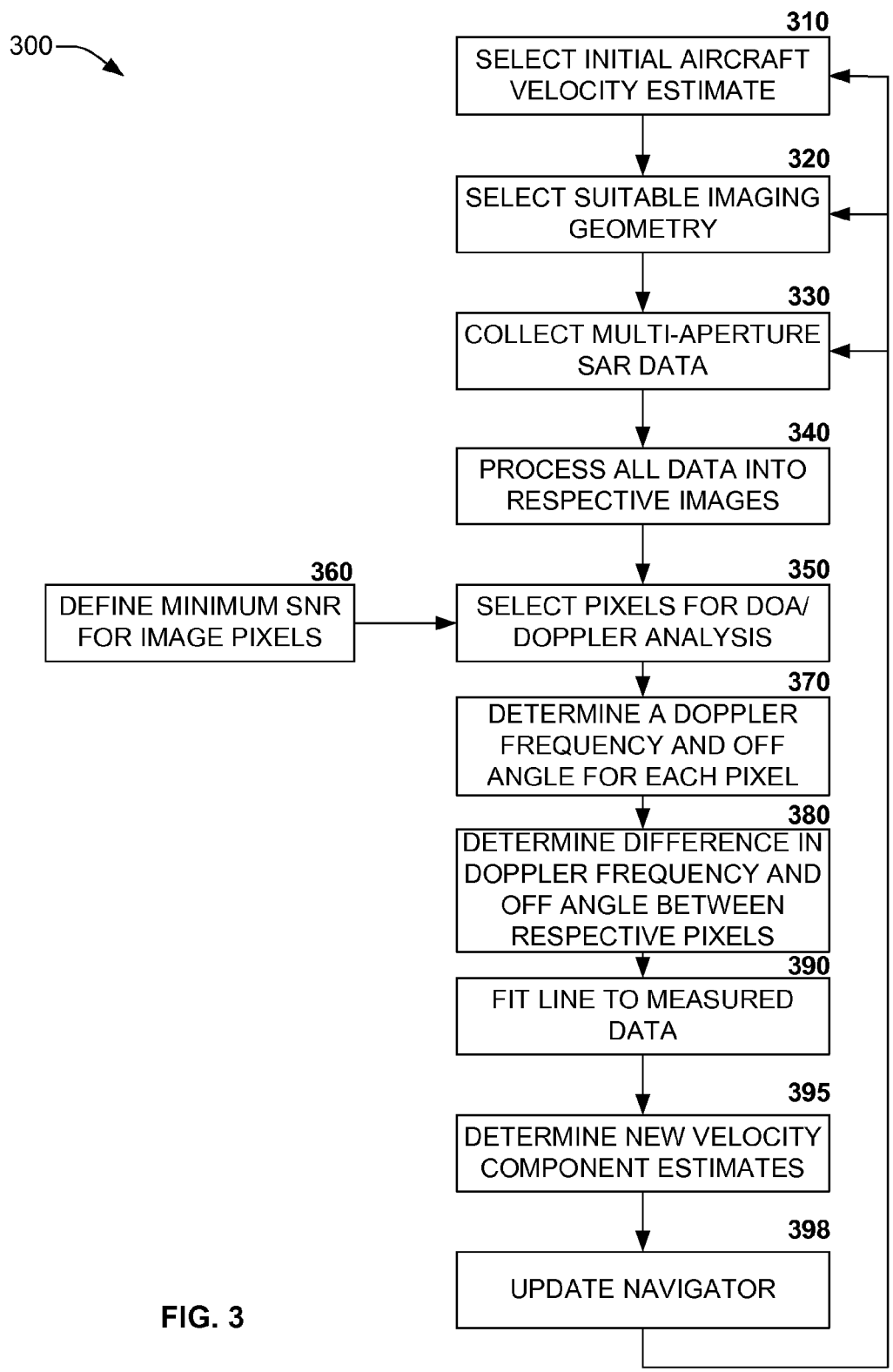
FIG. 3 is a flow diagram illustrating an exemplary methodology for determining velocity using DOA measurements.

FIG. 3 illustrates an exemplary methodology relating to determining a plurality of parameters relating to operation of an aircraft and an onboard antenna system based upon analyzing range-Doppler information. While the methodology is shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

FIG. 3 illustrates an exemplary methodology 300 for determining operational parameters relating to operation of an aircraft and/or an airborne radar system based upon analyzing range-Doppler information. As previously mentioned, in a conventional approach data from a GPS is utilized to provide absolute references for correcting errors which can occur at an IMU owing to noise, drift, etc. However, a situation can occur whereby GPS data is not available to an aircraft, and accordingly, instrument noise in the INS can cause drifts in the motion data, which can lead to inaccurate estimates of position, velocity, angular orientation, etc., and furthermore, can have a deleterious effect(s) on any SAR imaging being generated by a radar system located on the aircraft.

At 310, an initial velocity estimate is selected for the aircraft. The initial velocity estimate may be a best existing estimate from a navigation component (e.g., an INS) located on the aircraft, the current aircraft measured airspeed, a best guess at the aircraft's airspeed, zero velocity, etc.

At 320, an imaging geometry for the various measurements to be conducted is selected. The selected imaging geometry should be near to broadside of the aircraft's flight direction, or it might be broadside to the aircraft's body, with a range and depression angle that is expected for a radar signal(s) to land on the ground.

At 330, coincident synthetic apertures of radar data for each phase center or equivalent are collected. The radar data may include sum and difference channel data for a monopulse antenna located on the aircraft.

At 340, all of the collected data is then processed into one or more radar images (e.g., SAR images), with one radar image being generated for each channel of the collected data.

At 350, pixels are selected in the radar images, whereby pixel selection can be based upon meeting a threshold minimum SNR value. In an embodiment, the threshold value can be about 20 dB. As shown, at 360, the threshold SNR value can be predefined. The pixels can correlate to a target illuminated by the radar system.

At 370, for each selected pixel, a Doppler frequency is determined in conjunction with its calculated angle off of boresight. In an aspect, the Doppler frequency can be obtained from a range-Doppler map, i.e. a SAR image.

At 380, for respective pixels, e.g., a first pixel on a first radar image and a second pixel on a second radar image, whereby the first pixel and the second pixel correlate to the same target, the differences in their respective Doppler frequency and squint angle can be determined. The differences between a pixel pair can be represented as points or coordinates can be plotted, e.g., on a chart having an x axis being the squint angle, ϕ, and the y-axis being the Doppler frequency, $f_d$.

At 390, a best-fit line for the Doppler frequency data vs. squint angle data (e.g., angle off of boresight data) can be calculated for respective pixel pairs.

At 395, from the best-fit line, parameters of interest can be extracted and/or determined, including such parameters as aircraft forward velocity, velocity in the direction of antenna boresight, off-boresight angle, yaw, etc.

At 398, the extracted and/or determined parameters can be utilized to update the aircraft navigator to facilitate improved operation of the radar system (e.g., improve SAR imaging) and/or operation of the aircraft, e.g., such as changing a velocity of the aircraft, a heading of the aircraft, etc. The flow of methodology can return to any of acts 310, 320 or 330, whereby at act 310 a new initial velocity estimate can be selected (e.g., in accordance with the aircraft velocity estimate determined at act 390). At 320 a new imaging geometry for the various measurements to be conducted can be selected. At 330, a new collection of SAR-data can be conducted.

In an aspect, during collection of data (e.g., collection of SAR data), for maximum accuracy and precision, it is desired to keep the antenna pointed to a single scene reference point (SRP) on the ground (e.g., a target), in a spotlight fashion. However, to do so requires knowledge of an actual velocity of the aircraft, knowledge of which is also desired, and accordingly, may have to be determined concurrently with the directing of the antenna towards the SRP. An incorrect estimate of velocity can degrade the estimates of the various parameters being measured. However, the parameter estimates may be sufficiently accurate (e.g., compared with an initial aircraft velocity estimate) to facilitate acceptable determinations. Consequently, it is possible to iterate the methodology 300 presented in FIG. 3 to continuously refine the velocity estimates to first optimally determine the velocity estimates with maximum accuracy and precision, and then to track any changes.

Further, during each iteration of methodology 300 (e.g., from a first sequence of acts 310 to 398 and returning to act 310) the imaging geometry can be altered if so desired.

Furthermore, if a poor initial velocity estimate is anticipated, it is possible to initiate methodology 300 at act 330 with a radar image having a relatively coarse resolution.

It is anticipated that the various operations and technologies presented in FIGS. 1-3 may run continuously during a stripmap SAR imaging operation.

As previously presented, the various embodiments and techniques presented herein relate to determining velocity parameters using DOA measures. In summary, the embodiments and techniques include:

(a) Two or more independent DOA measures (e.g., from a first pixel, from a second pixel, from an $n^{th}$ pixel) can be compared (e.g., by a comparator component 170) to their Doppler measures to determine a general relation between the two or more DOA measures.

(b) The various data can be plotted and based thereon, a best fit line can be determined.

(c) Parameters of the best-fit line (e.g., slope and intercepts) can be utilized to calculate aircraft velocity (e.g., forward motion of the aircraft), velocity in the direction of the boresight of the antenna, squint angles, etc.

(d) The aircraft velocity data can be fed back to a radar system being utilized in the SAR operation and/or the aircraft's navigation component (e.g., an INS) to improve their performance.

Figure 4:
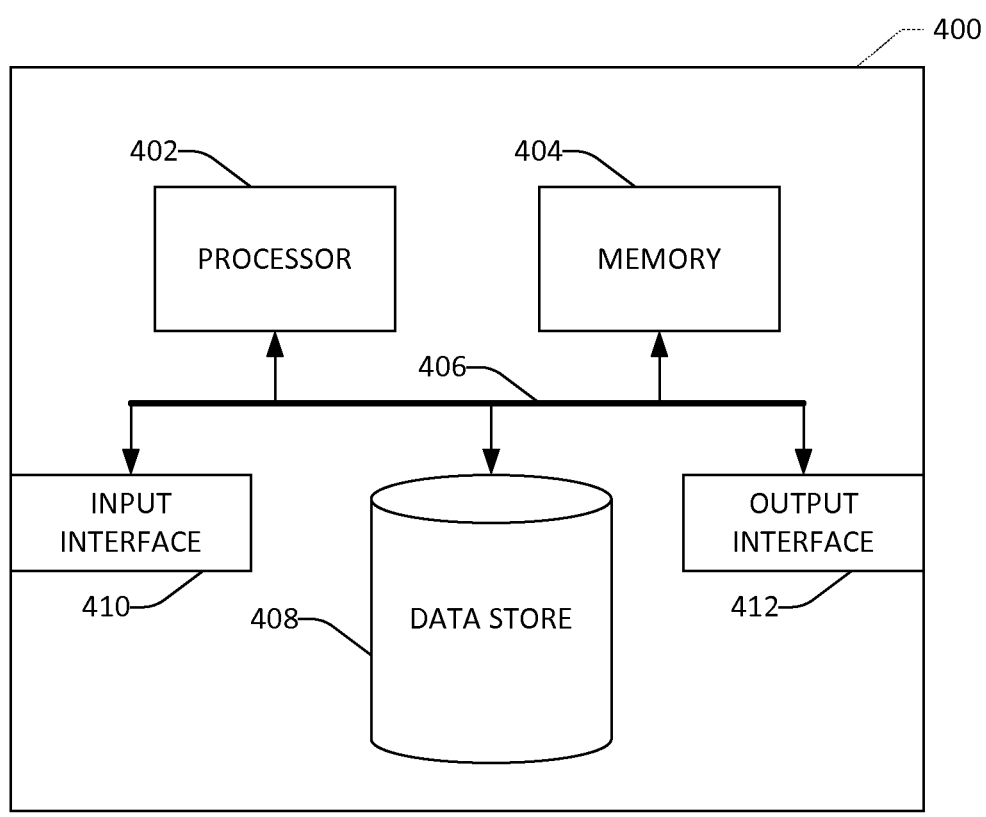
FIG. 4 illustrates an exemplary computing device.

Referring now to FIG. 4, a high-level illustration of an exemplary computing device 400 that can be used in accordance with the systems and methodologies disclosed herein is illustrated. For instance, the computing device 400 may be used in a system to analyze Doppler frequency and squint angle data for a plurality of pixels in a plurality of radar images to determine velocity of an aircraft, etc. The computing device 400 includes at least one processor 402 that executes instructions that are stored in a memory 404. The instructions may be, for instance, instructions for implementing functionality described as being carried out by one or more components discussed above or instructions for implementing one or more of the methods described above. The processor 402 may access the memory 404 by way of a system bus 406. In addition to storing executable instructions, the memory 404 may also store operating parameters, required operating parameters, and so forth.

The computing device 400 additionally includes a data store 408 that is accessible by the processor 402 by way of the system bus 406. The data store 408 may include executable instructions, operating parameters, required operating parameters, etc. The computing device 400 also includes an input interface 410 that allows external devices to communicate with the computing device 400. For instance, the input interface 410 may be used to receive instructions from an external computer device, from a user, etc. The computing device 400 also includes an output interface 412 that interfaces the computing device 400 with one or more external devices. For example, the computing device 400 may display text, images, etc., by way of the output interface 412.

Additionally, while illustrated as a single system, it is to be understood that the computing device 400 may be a distributed system. Thus, for instance, several devices may be in communication by way of a network connection and may collectively perform tasks described as being performed by the computing device 400.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component" and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An aircraft radar system comprising:
   a comparator component configured to:
      identify a first pixel in a first radar image;
      identify a second pixel in a second radar image, wherein the first pixel and the second pixel both correlate to a target illuminated by the radar system;
      obtain first Doppler frequency information and a first squint angle for the first pixel and second Doppler frequency information and a second squint angle for the second pixel;
      identify a relationship between the first pixel and the second pixel, wherein the relationship is a function of the first Doppler frequency information, the first squint angle, the second Doppler frequency information, and the second squint angle; and
      determine, based upon the identified relationship between the first pixel and the second pixel, an actual velocity of the aircraft.

2. The aircraft radar system of claim 1, wherein the comparator component is further configured, as a function of the identification of the relationship between the first pixel and the second pixel, to:
   determine a first coordinate which represents the first Doppler frequency information and the first squint angle;
   determine a second coordinate which represents the second Doppler frequency information and the second squint angle;
   determine a best fit line between the first coordinate and the second coordinate; and
   determine, from a slope of the best fit line, the actual velocity of the aircraft.

3. The aircraft radar system of claim 1, further comprising a navigator component, wherein the navigator component is configured to determine an initial velocity of the aircraft.

4. The aircraft radar system of claim 3, wherein the comparator component is configured to communicate the actual velocity of the aircraft to the navigator component.

5. The aircraft radar system of claim 4, wherein the navigator component is further configured to update the initial velocity of the aircraft by replacing the initial velocity of the aircraft with the actual velocity of the aircraft received from the comparator component.

6. The aircraft radar system of claim 1, wherein the comparator component is further configured to update the first radar image or the second radar image with the determined actual velocity of the aircraft.

7. The aircraft radar system of claim 1, wherein the first pixel has a signal to noise ratio greater than a threshold value and the second pixel has a signal to noise ratio greater than the threshold value.

8. The aircraft radar system of claim 1, wherein the radar system further comprises a monopulse antenna to illuminate the target.

9. A method for determining aircraft velocity for an aircraft, comprising:
- selecting a first pixel in a first range-Doppler map, wherein the first pixel includes first data comprising a first Doppler frequency and a first squint angle, and the first range-Doppler map is obtained from radar data collected by a radar system located on the aircraft;
- selecting a second pixel in the first range-Doppler map, wherein the second pixel includes second data comprising a second Doppler frequency and a second squint angle;
- selecting a third pixel in a second range-Doppler map, wherein the first pixel and the third pixel both correlate to a target illuminated by the radar system, the third pixel includes third data comprising a third Doppler frequency and a third squint angle;
- selecting a fourth pixel in the second range-Doppler map, wherein the second pixel and the fourth pixel both correlate to a target illuminated by the radar system, the fourth pixel includes fourth data comprising a fourth Doppler frequency and a fourth squint angle;
- determining a first coordinate representing a first difference between the first Doppler frequency and the third Doppler frequency and a second difference between the first squint angle and the third squint angle;
- determining a second coordinate representing a third different between the second Doppler frequency and the fourth Doppler frequency and a fourth difference between the second squint angle and the fourth squint angle;
- determining a best fit line between the first coordinate and the second coordinate; and
- determining, from a slope of the best fit line, the aircraft velocity.

10. The method for determining aircraft velocity for an aircraft of claim 9, further comprising updating a navigator system on the aircraft with the aircraft velocity.

11. The method for determining aircraft velocity for an aircraft of claim 9, further comprising correcting a synthetic aperture radar image generated by the radar system, the correcting being in accordance with the determined aircraft velocity.

12. The method for determining aircraft velocity for an aircraft of claim 9, further comprising determining an intercept of the best fit line and a squint angle axis to obtain a squint angle identifying an alignment of an antenna of the radar system to the target.

13. The method for determining aircraft velocity for an aircraft of claim 12, wherein the target is stationary.

14. The method for determining aircraft velocity for an aircraft of claim 9, further comprising determining an intercept of the best fit line and a Doppler frequency axis to obtain an antenna beam boresight for an alignment of an antenna of the radar system to the target.

15. The method for determining aircraft velocity for an aircraft of claim 9, wherein the aircraft is in straight and level flight.

16. The method for determining aircraft velocity for an aircraft of claim 9, wherein the first pixel, the second pixel, the third pixel, and the fourth pixel each have a signal to noise ratio greater than a threshold value.

17. An integrated circuit configured to perform acts, the acts comprising:
- selecting a first pixel in a first range-Doppler map, wherein the first pixel includes first data comprising a first Doppler frequency and a first squint angle, and the first range-Doppler map is obtained from radar data collected by a radar system located on the aircraft;
- selecting a second pixel in the first range-Doppler map, wherein the second pixel includes second data comprising a second Doppler frequency and a second squint angle;
- selecting a third pixel in a second range-Doppler map, wherein the first pixel and the third pixel both correlate to a target illuminated by the radar system, the third pixel includes third data comprising a third Doppler frequency and a third squint angle;
- selecting a fourth pixel in the second range-Doppler map, wherein the second pixel and the fourth pixel both correlate to the target illuminated by the radar system, the fourth pixel includes fourth data comprising a fourth Doppler frequency and a fourth squint angle;
- determining a first coordinate representing a first difference between the first Doppler frequency and the third Doppler frequency and a second difference between the first squint angle and the third squint angle;
- determining a second coordinate representing a third different between the second Doppler frequency and the fourth Doppler frequency and a fourth difference between the second squint angle and the fourth squint angle;
- determining a best fit line between the first coordinate and the second coordinate; and
- determining, from a slope of the best fit line, the aircraft velocity.

18. The integrated circuit of claim 17, further comprising determining from an intercept of the best fit line and a squint angle axis to obtain a squint angle identifying an alignment of an antenna of the radar system to the target.

19. The integrated circuit of claim 18, further comprising correcting data in a radar image, wherein the correcting is performed based at least in part upon the aircraft velocity and the squint angle.

* * * * *